US008930962B2

(12) United States Patent
Archer et al.

(10) Patent No.: US 8,930,962 B2
(45) Date of Patent: Jan. 6, 2015

(54) PROCESSING UNEXPECTED MESSAGES AT A COMPUTE NODE OF A PARALLEL COMPUTER (75) Inventors: Charles J. Archer, Rochester, MN (US); James E. Carey, Rochester, MN (US); Philip J. Sanders, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 13/401,975

(22) Filed: Feb. 22, 2012

(65) Prior Publication Data
US 2013/0219410 A1 Aug. 22, 2013

(51) Int. Cl.
G06F 9/54 (2006.01)
G06F 9/44 (2006.01)

(52) U.S. Cl.
USPC .......................................... 719/313; 712/225

(58) Field of Classification Search
None
See application file for complete search history.

(56) References Cited

U.S. PATENT DOCUMENTS

| 4,933,840 | A | 6/1990 | Sera et al. |
| 4,933,846 | A | 6/1990 | Humphrey et al. |
| 5,050,162 | A | 9/1991 | Golestani |
| 5,083,265 | A | 1/1992 | Valiant |
| 5,136,582 | A | 8/1992 | Firoozmand |
| 5,193,179 | A | 3/1993 | Laprade et al. |
| 5,218,676 | A | 6/1993 | Ben-Ayed et al. |
| 5,319,638 | A | 6/1994 | Lin |
| 5,347,450 | A | 9/1994 | Nugent |
| 5,437,042 | A | 7/1995 | Culley et al. |
| 5,448,698 | A | 9/1995 | Wilkes |
| 5,453,978 | A | 9/1995 | Sethu et al. |
| 5,617,537 | A | 4/1997 | Yamada et al. |
| 5,630,059 | A * | 5/1997 | Brady et al. .................. 709/217 |
| 5,680,116 | A | 10/1997 | Hashimoto et al. |
| 5,689,509 | A | 11/1997 | Gaytan et al. |
| 5,721,921 | A | 2/1998 | Kessler et al. |
| 5,758,075 | A | 5/1998 | Graziano et al. |
| 5,781,775 | A | 7/1998 | Ueno |
| 5,790,530 | A | 8/1998 | Moh et al. |

(Continued)

OTHER PUBLICATIONS

Watson, R., "DMA controller programming in C," C Users Journal, Nov. 1993, pp. 35-50 (10 Total Pages), v11 n11, R & D Publications, Inc., Lawrence, KS, USA. ISSN: 0898-9788.

(Continued)

*Primary Examiner* — Andy Ko
*Assistant Examiner* — Abdou Seye
(74) *Attorney, Agent, or Firm* — Biggers Kennedy Lenart Spraggins LLP (57) ABSTRACT

Methods, apparatuses, and computer program products for processing unexpected messages at a compute node of a parallel computer are provided. Embodiments include receiving, by the compute node, a portion of a message from another compute node of the parallel computer, the message comprising a plurality of separate portions; in response to receiving the portion of the message, determining, by the compute node, whether one of the applications executing on the compute node, has indicated that the message is expected; if one of the applications executing on the compute node has not indicated that the message is expected, storing, by the compute node, the portion of the message in an unexpected message buffer within the compute node; and if one of the applications executing on the compute node has indicated that the message is expected, storing the portion of the message at a storage destination indicated by the message.

15 Claims, 6 Drawing Sheets

(56) References Cited

U.S. PATENT DOCUMENTS

| | | | |
|---|---|---|---|
| 5,796,735 A | 8/1998 | Miller et al. | |
| 5,802,366 A | 9/1998 | Row et al. | |
| 5,835,482 A | 11/1998 | Allen | |
| 5,928,351 A | 7/1999 | Horie et al. | |
| 5,933,425 A | 8/1999 | Iwata | |
| 5,954,794 A | 9/1999 | Fishler et al. | |
| 5,959,995 A | 9/1999 | Wicki et al. | |
| 5,961,659 A | 10/1999 | Benner | |
| 5,995,503 A | 11/1999 | Crawley et al. | |
| 6,070,189 A | 5/2000 | Bender et al. | |
| 6,072,781 A | 6/2000 | Feeney et al. | |
| 6,081,506 A | 6/2000 | Buyukkoc et al. | |
| 6,085,303 A | 7/2000 | Thorson et al. | |
| 6,105,122 A | 8/2000 | Muller et al. | |
| 6,161,198 A | 12/2000 | Hill et al. | |
| 6,356,951 B1 | 3/2002 | Gentry, Jr. | |
| 6,486,983 B1 | 11/2002 | Beshai et al. | |
| 6,711,632 B1 | 3/2004 | Chow et al. | |
| 6,735,662 B1 | 5/2004 | Connor | |
| 6,744,765 B1 | 6/2004 | Dearth et al. | |
| 6,748,413 B1 | 6/2004 | Bournas | |
| 6,754,732 B1 | 6/2004 | Dixon et al. | |
| 6,857,030 B2 | 2/2005 | Webber | |
| 6,901,052 B2 | 5/2005 | Buskirk et al. | |
| 6,977,894 B1 | 12/2005 | Achilles et al. | |
| 6,981,074 B2 | 12/2005 | Oner et al. | |
| 7,031,305 B1 | 4/2006 | Yu et al. | |
| 7,054,958 B2 | 5/2006 | Iyer et al. | |
| 7,089,289 B1 | 8/2006 | Blackmore et al. | |
| 7,111,092 B1 | 9/2006 | Mitten et al. | |
| 7,120,916 B1 | 10/2006 | Firth et al. | |
| 7,155,541 B2 | 12/2006 | Ganapathy et al. | |
| 7,319,695 B1 | 1/2008 | Agarwal et al. | |
| 7,406,086 B2 | 7/2008 | Deneroff et al. | |
| 7,552,312 B2 | 6/2009 | Archer et al. | |
| 7,805,546 B2 | 9/2010 | Archer et al. | |
| 7,827,024 B2 | 11/2010 | Archer et al. | |
| 7,836,143 B2 | 11/2010 | Blocksome et al. | |
| 7,890,670 B2 | 2/2011 | Archer et al. | |
| 8,219,659 B2 | 7/2012 | O'Neal et al. | |
| 2003/0233497 A1 | 12/2003 | Shih | |
| 2004/0001508 A1 | 1/2004 | Zheng et al. | |
| 2004/0057380 A1 | 3/2004 | Biran et al. | |
| 2004/0078405 A1 | 4/2004 | Bhanot et al. | |
| 2004/0218631 A1 | 11/2004 | Ganfield | |
| 2005/0002334 A1 | 1/2005 | Chao et al. | |
| 2005/0018682 A1 | 1/2005 | Ferguson et al. | |
| 2005/0033874 A1 | 2/2005 | Futral et al. | |
| 2005/0068946 A1 | 3/2005 | Beshai | |
| 2005/0078669 A1 | 4/2005 | Oner | |
| 2005/0091334 A1 | 4/2005 | Chen et al. | |
| 2005/0100035 A1 | 5/2005 | Chiou et al. | |
| 2005/0108425 A1 | 5/2005 | Rabinovitch | |
| 2005/0114561 A1 | 5/2005 | Lu et al. | |
| 2005/0198113 A1 | 9/2005 | Mohamed et al. | |
| 2005/0213570 A1 | 9/2005 | Stacy et al. | |
| 2006/0002424 A1 | 1/2006 | Gadde | |
| 2006/0045005 A1 | 3/2006 | Blackmore et al. | |
| 2006/0045109 A1 | 3/2006 | Blackmore et al. | |
| 2006/0047771 A1 | 3/2006 | Blackmore et al. | |
| 2006/0056405 A1 | 3/2006 | Chang et al. | |
| 2006/0075057 A1 | 4/2006 | Gildea et al. | |
| 2006/0150010 A1 | 7/2006 | Stiffler et al. | |
| 2006/0161733 A1 | 7/2006 | Beckett et al. | |
| 2006/0161737 A1 | 7/2006 | Martin et al. | |
| 2006/0190640 A1 | 8/2006 | Yoda et al. | |
| 2006/0195336 A1 | 8/2006 | Greven et al. | |
| 2006/0206635 A1 | 9/2006 | Alexander et al. | |
| 2006/0218429 A1 | 9/2006 | Sherwin et al. | |
| 2006/0230119 A1 | 10/2006 | Hausauer et al. | |
| 2006/0253619 A1 | 11/2006 | Torudbakken et al. | |
| 2007/0041383 A1 | 2/2007 | Banikazemi et al. | |
| 2007/0165672 A1 | 7/2007 | Keels et al. | |
| 2007/0198519 A1 | 8/2007 | Dice et al. | |
| 2008/0016249 A1 | 1/2008 | Ellis et al. | |
| 2008/0022079 A1* | 1/2008 | Archer et al. | 712/225 |
| 2008/0101295 A1 | 5/2008 | Tomita et al. | |
| 2008/0109573 A1 | 5/2008 | Leonard et al. | |
| 2008/0222317 A1 | 9/2008 | Go et al. | |
| 2008/0267066 A1 | 10/2008 | Archer et al. | |
| 2008/0270563 A1 | 10/2008 | Blocksome et al. | |
| 2008/0273543 A1 | 11/2008 | Blocksome et al. | |
| 2008/0281997 A1 | 11/2008 | Archer et al. | |
| 2008/0301327 A1 | 12/2008 | Archer et al. | |
| 2008/0301704 A1 | 12/2008 | Archer et al. | |
| 2008/0313341 A1 | 12/2008 | Archer et al. | |
| 2009/0006662 A1 | 1/2009 | Chen et al. | |
| 2009/0006808 A1 | 1/2009 | Blumrich et al. | |
| 2009/0019190 A1 | 1/2009 | Blocksome | |
| 2009/0022156 A1 | 1/2009 | Blocksome | |
| 2009/0031001 A1 | 1/2009 | Archer et al. | |
| 2009/0031002 A1 | 1/2009 | Blocksome | |
| 2009/0031055 A1 | 1/2009 | Archer et al. | |
| 2009/0125604 A1 | 5/2009 | Chang et al. | |
| 2009/0154486 A1 | 6/2009 | Archer et al. | |
| 2009/0210586 A1 | 8/2009 | Tanabe | |
| 2009/0248894 A1 | 10/2009 | Archer et al. | |
| 2009/0248895 A1 | 10/2009 | Archer et al. | |
| 2009/0276582 A1 | 11/2009 | Furtek et al. | |
| 2010/0082848 A1 | 4/2010 | Blocksome et al. | |
| 2010/0232448 A1* | 9/2010 | Sugumar et al. | 370/412 |
| 2010/0268852 A1 | 10/2010 | Archer et al. | |
| 2011/0197204 A1 | 8/2011 | Archer et al. | |
| 2011/0222440 A1 | 9/2011 | Phillips et al. | |
| 2011/0265098 A1 | 10/2011 | Dozsa et al. | |
| 2012/0137294 A1 | 5/2012 | Archer et al. | |
| 2013/0018947 A1 | 1/2013 | Archer et al. | |
| 2013/0061246 A1 | 3/2013 | Archer et al. | |
| 2013/0066938 A1 | 3/2013 | Archer et al. | |
| 2013/0073752 A1 | 3/2013 | Blocksome | |

OTHER PUBLICATIONS

Notice of Allowance, U.S. Appl. No. 12/702,661, May 15, 2013, pp. 1-9.

Notice of Allowance, U.S. Appl. No. 13/666,604, Sep. 25, 2013, pp. 1-10.

Office Action, U.S. Appl. No. 13/666,604, May 30, 2013, pp. 1-16.

Office Action, U.S. Appl. No. 13/676,700, Jun. 5, 2013, pp. 1-31.

Office Action, U.S. Appl. No. 13/671,055, Jul. 31, 2013, pp. 1-18.

Office Action, U.S. Appl. No. 13/769,715, Jul. 31, 2013, pp. 1-28.

Brightwell. R., et al., "An Analysis of NIC Resource Usage for Offloading MPI", 18th International Parallel and Distributed Processing Symposium (IPDPS'04) Workshop 8, Apr. 26-30, 2004, 8 pp., vol. 9, IEEE Computer Society, USA, Digital Object Identifier: 10.1109/IPDPS.2004.1303192.

Brightwell, R., et al., "The Impact of MPI Queue Usage on Message Latency", International Conference on Parallel Processing (ICPP'04), Issue Date: Aug. 15-18, 2004, pp. 152-160, vol. 1, IEEE Computer Society USA, Digital Object Identifier: 10.1109/ICPP.2004.1327915.

Brightwell, R., et al., "A Hardware Acceleration Unit for MPI Queue Processing", 19th IEEE International Parallel and Distributed Processing Symposium (IPDPS'05), Issue Date: Apr. 4-8, 2005, pp. 1-12, vol. 1, IEEE Computer Society, USA, Digital Object Identifier: 10.1109/IPDPS.2005.30.

Almasi, G., et al., "MPI on BlueGene/L: Designing an Efficient General Purpose Messaging Solution for a Large Cellular System," Recent Advances in Parallel Virtual Machine and Message Passing Interface, Proceedings. 10th European PVM/MPI User's Group Meeting, Venice, Italy, Sep. 29-Oct. 2, 2003, pp. 352-361, Springer Berlin Heidelberg. DOI: 10.1007/978-3-540-39924-7_49.

Almasi, G., et al., "Architecture and Performance of the BlueGene/L Message Layer," Recent Advances in Parallel Virtual Machine and Message Passing Interface, Proceedings. 11th European PVM/MPI Users' Group Meeting Budapest, Hungary, Sep. 19-22, 2004, pp. 405-414, Springer Berlin Heidelberg. DOI: 10.1007/978-3-540-30218-6_55.

Pritchard, J., "COM and CORBA Side by Side: Architectures, Strategies, and Implementations," Jul. 1999, pp. 74-84, Addison Wesley Longman, Inc., Reading, Massachusetts, USA. ISBN 0--201-37945-7.

(56) References Cited

OTHER PUBLICATIONS

Zukowski, J., et al., "Mastering Java 1.2," Month: Unknown, Year: 1998, pp. 900-903, SYBEX, San Francisco, California, USA. ISBN: 0-7821-2180-2.

Fink, T., "Integrating MPI Components into Metacomputing Applications," Recent Advances in Parallel Virtual Machine and Message Passing Interface, Proceedings. 7th European PVM/MPI Users' Group Meeting Balatonfüred, Hungary, Sep. 10-13, 2000, pp. 208-2015, Springer Berlin Heidelberg. DOI: 10.1007/3-540-45255-9_30.

Ribler, R., et al., "The Autopilot performance-directed adaptive control system," Sep. 1, 2001, pp. 175-187, vol. 18, No. 1, Elsevier Science Publishers, Elsevier Science Publishers B. V. Amsterdam, The Netherlands, The Netherlands. DOI: 10.1016/S0167-739X(01)00051-6.

Zhang, Y., et al., "Automatic Performance Tuning for J2EE Application Server Systems,"Automatic Performance Tuning for J2EE Application Server Systems, Web Information Systems Engineering—WISE 2005, Proceedings. 6th International Conference on Web Information Systems Engineering, New York, NY, USA, Nov. 20-22, 2005, pp. 520-527, Springer Berlin Heidelberg. DOI: 10.1007/11581062_43.

Chung, I., et al., "Automated Cluster-Based Web Service Performance Tuning," Proceedings. 13th IEEE International Symposium on High Performance Distributed Computing (HPDC-13 '04), Jun. 4-6, 2004, pp. 36-44, IEEE Computer Society, CS Digital Library. ISBN: 0-7803-2175-4.

Hondroudakis, A., et al., "An Empirically Derived Framework for Classifying Parallel Program Performance Tuning Problems," Proceeding. SPDT '98 Proceedings of the SIGMETRICS symposium on Parallel and distributed Tools, Aug. 3-4, 1998, pp. 112-123, ACM, New York, NY, USA. DOI: 10.1145/281035.281047.

Gara, M., et al., "Overview of the Blue Gene/L system architecture," IBM Journal of Research & Development, Mar. 2005, pp. 195-212, vol. 49, Issue: 2.3, IEEE Xplore Digital Library. DOI: 10.1147/rd.492.0195.

Adiga, N., et al., "Blue Gene/L torUS-interconnection network," IBM Journal of Research & Development, Mar. 2005, pp. 265-276, vol. 49, Issue: 2, IBM Corp. Riverton, NJ, USA, ACM Digital Library. DOI: 10.1147/rd.492.0265.

Barnett, M., et al., "Broadcasting on Meshes with Worm-Hole Routing," Second Revised Version, Dec. 1995, pp. 1-22, CiteSeerX (Online Publication). URL: http://webcache.googleusercontent.com/search?q=cache:Kkso1JLnAYwJ:citeseerx.ist.psu.edu/viewdoc/download%3Fdoi%3D10.1.1.50.5075%26rep%3Drep1%26type%3Dps+&cd=1&hl=en&ct=clnk&gl=us.

Moreira, J., et al., "The Blue Gene/L Supercomputer: A Hardware and Software Story," International Journal of Parallel Programming, Jun. 2007, pp. 181-206, vol. 35, No. 3, Springer Science+Business Media, LLC, USA. DOI: 10.1007/s10766-007-0037-2.

Kumar, S., et al., "A Network on Chip Architecture and Design Methodology," Proceedings of the IEEE Computer Society Annual Symposium on VLSI (ISVLSI'02), Apr. 25-26, 2002, Pittsburgh, PA, USA, pp. 105-112, IEEE Xplore Digital Library. DOI: 10.1109/ISVLSI.2002.1016885.

Watson, R., "DMA controller programming in C," C Users Journal, Nov. 1993, 10 Pages, v11 n11, ACM Digital Library, R & D Publications, Inc., Lawrence, KS, USA. ISSN: 0898-9788.

Office Action, U.S. Appl. No. 13/181,601, Apr. 10, 2014, pp. 1-19.

\* cited by examiner

PROCESSING UNEXPECTED MESSAGES AT A COMPUTE NODE OF A PARALLEL COMPUTER

BACKGROUND OF THE INVENTION

1. Field of the Invention

The field of the invention is data processing, or, more specifically, methods, apparatuses, and computer program products for processing unexpected messages at a compute node of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can be massively parallel and include many compute nodes within a computing system. Parallel computing is the partitioning or dividing of an algorithm into units, often called threads, which are simultaneously or concurrently executed on multiple processors. The intermediate results of these multiple threads are then combined into a final result. Thus, parallel computing is based on the idea that the process of solving a problem usually can be divided into smaller tasks, which may be carried out simultaneously with some coordination. Parallel computing is valuable because performing a large task by the parallel execution of smaller tasks can be faster than performing the large task via one serial (non-parallel) algorithm.

The parallel threads are often implemented on computer systems that include multiple processors and/or on multiple computer systems (often called compute nodes or simply nodes) that comprise processors, which run the parallel threads or local instances of global applications to accomplish tasks. The parallel thread or threads local to a particular node need a way to communicate with other parallel threads, which is often accomplished via a technique known as message passing. To ensure proper communication between various nodes, a standard known as the Message Passing Interface (MPI) has been developed.

Under the MPI standard, an MPI program consists of autonomous processes, executing their own code, which need not be identical. Typically, each process or application communicates via calls to MPI communication primitives, where each process executes in its own and shared memory. Such message passing allows the local processors comprising the node and applications running thereon (a thread or instance of the global application or process) to cooperate with each other. MPI is available on a wide variety of platforms, ranging from networks of workstations to massively parallel systems. Each message received by a compute node is eventually stored by the compute node. In a parallel computer with hundreds or thousands of compute nodes, where each compute node is continually storing thousands of messages, efficient storage of the messages plays an important role in the overall efficiency of the parallel computer.

SUMMARY OF THE INVENTION

Methods, apparatuses, and computer program products for processing unexpected messages at a compute node of a parallel computer are provided. Embodiments include receiving, by the compute node, a portion of a message from another compute node of the parallel computer, the message comprising a plurality of separate portions; in response to receiving the portion of the message, determining, by the compute node, whether one of the applications executing on the compute node, has indicated that the message is expected; if one of the applications executing on the compute node has not indicated that the message is expected, storing, by the compute node, the portion of the message in an unexpected message buffer within the compute node; and if one of the applications executing on the compute node has indicated that the message is expected, storing, by the compute node, the portion of the message at a storage destination indicated by the message.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatuses, and computer program products for processing unexpected messages at a compute node of a parallel computer in accordance with the present invention are described with reference to the accompanying drawings, beginning with FIG. 1.

Figure 1:
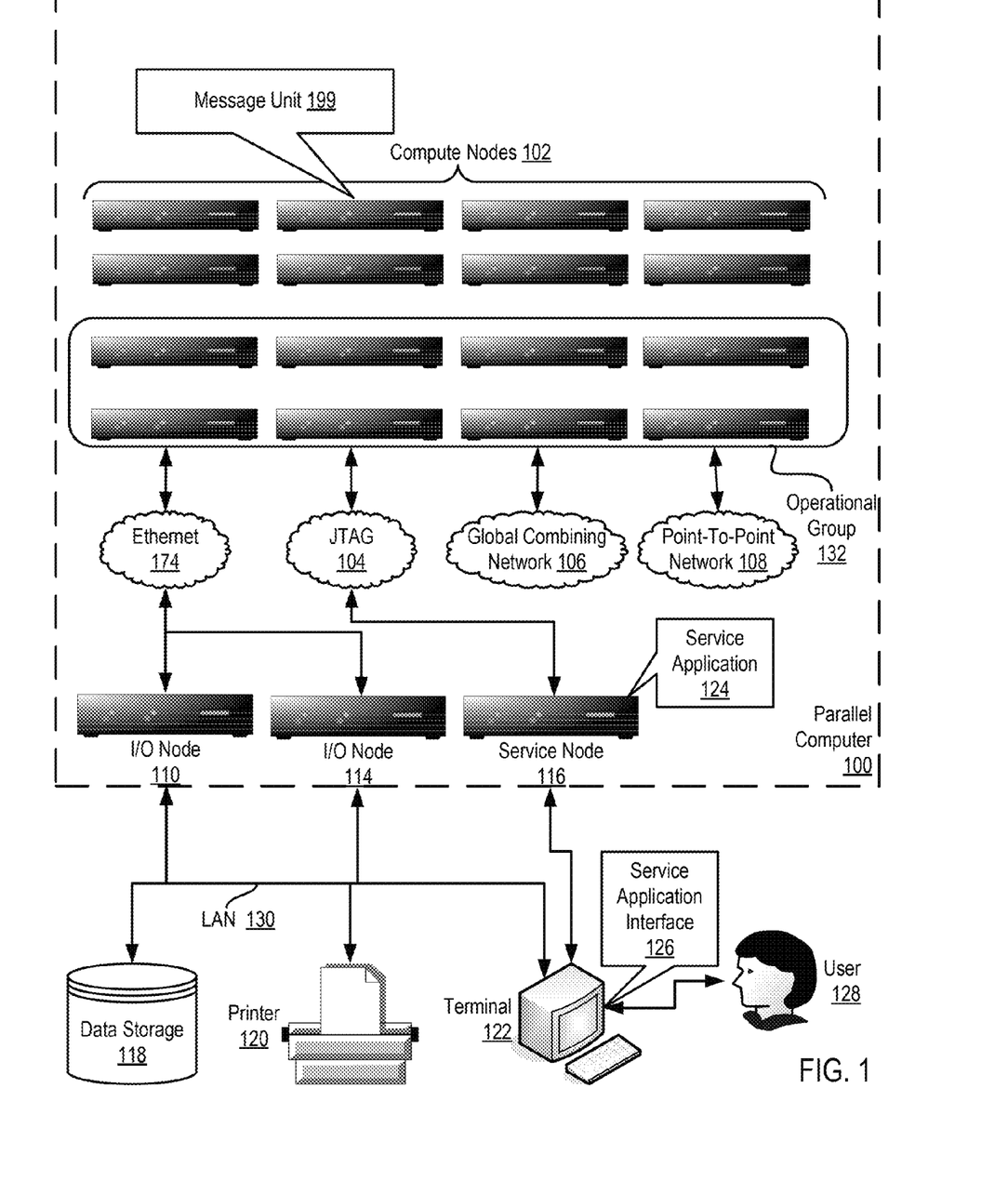
FIG. 1 illustrates an example system for processing unexpected messages at a compute node of a parallel computer according to embodiments of the present invention.

FIG. 1 illustrates an example system for processing unexpected messages at a compute node of a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product

MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for processing unexpected messages at a compute node of a parallel computer in accordance with embodiments of the present invention. To process unexpected messages, each compute node of the plurality of compute nodes (102) may include a message unit (199). A message unit may include hardware or software for processing messages received by the compute node and for transferring messages from the compute node to other compute nodes of the parallel computer. In a particular embodiment, the message unit (199) of FIG. 1 includes computer program instructions that when executed by a processor of the compute node causes the compute node to carry out the steps of: receiving, by the compute node, a portion of a message from another compute node of the parallel computer; in response to receiving the portion of the message, determining, by the compute node, whether one of the applications executing on the compute node, has indicated that the message is expected; if one of the applications executing on the compute node has not indicated that the message is expected, storing, by the compute node, the portion of the message in an unexpected message buffer within the compute node; and if one of the applications executing on the compute node has indicated that the message is expected, storing, by the compute node, the portion of the message at a storage destination indicated by the message.

Processing unexpected messages at a compute node of a parallel computer according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters.

Figure 2:
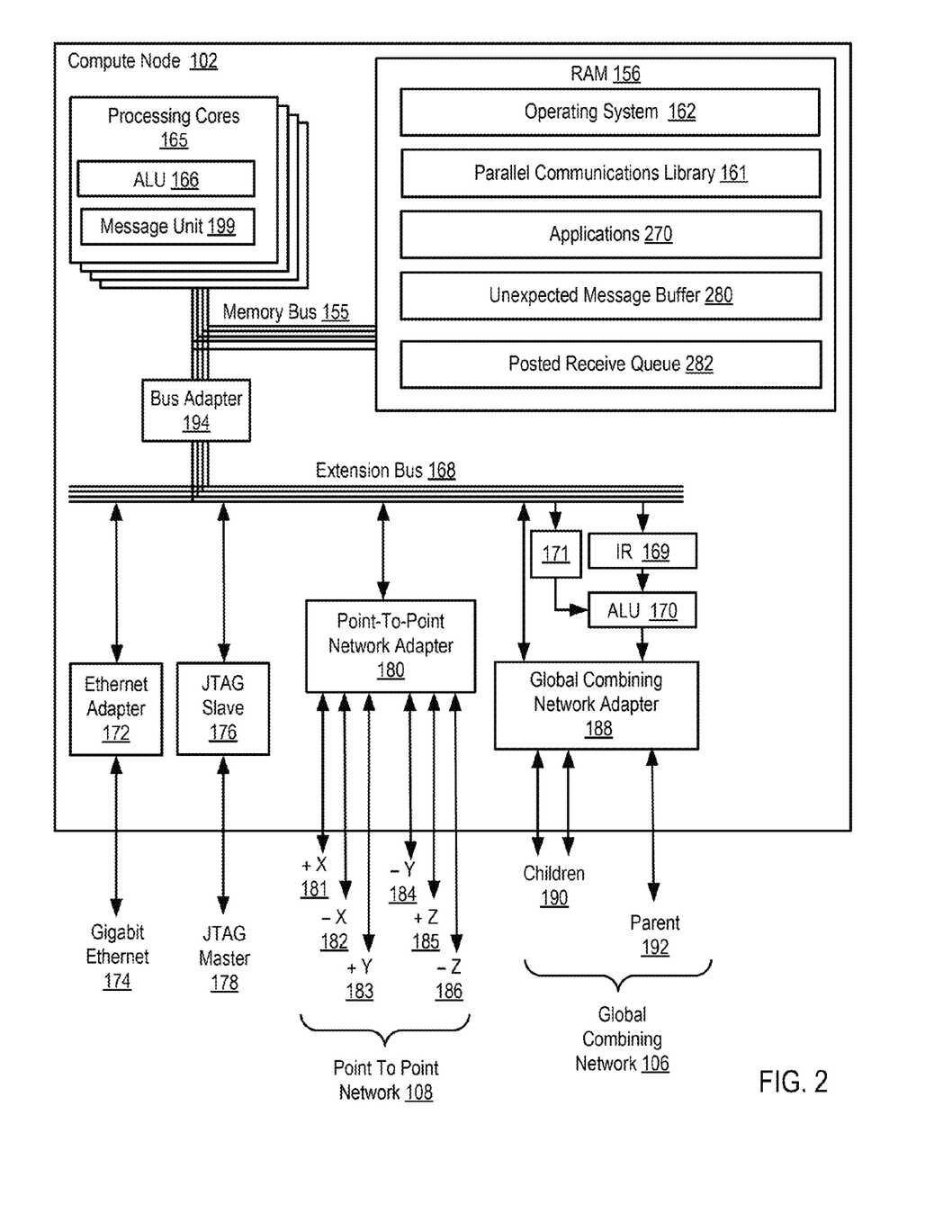
FIG. 2 sets forth a block diagram of an example compute node useful in a parallel computer capable of processing unexpected messages at a compute node of a parallel computer according to embodiments of the present invention.

For further explanation, FIG. 2 sets forth a block diagram of an example compute node (102) useful in a parallel computer capable of processing unexpected messages at a compute node of a parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node.

Stored in RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) are applications (270). Each application (270) in the example of FIG. 2 may be configured as one instance of a parallel application with other instances executing amongst a plurality of compute nodes organized into an operational group. That is, the applications (270) may include modules of computer program instructions that carry out parallel, user-level data processing using parallel algorithms.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Also stored in RAM (156) is an unexpected message buffer (280) and a posted receive queue (282). An unexpected message buffer stores portions of a message that is received by a compute node before one of the applications (270) executing on the compute node indicates that the message is expected. A posted receive queue is used to track which messages are expected. That is, a posted receive queue may comprise entries that identify receive requests that were generated in response to function calls made by the applications (270) executing on the compute node. These receive requests are commands or requests to receive data from other compute nodes via one or more data communication networks. Although the unexpected message buffer (280) and the posted receive queue (282) are illustrated in RAM (156), both the unexpected message buffer (280) and the posted receive queue (282) may be stored in any number of other locations within a compute node, such as for example, the message unit (199).

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus capable of processing unexpected messages at a compute node of a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems capable of processing unexpected messages at a compute node of a parallel computer according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188)

performs a bitwise OR on the data received from the children nodes (190), dedicated hardware (171) may inject zeros into the ALU (170) to improve performance throughout the global combining network (106).

Figure 3A:
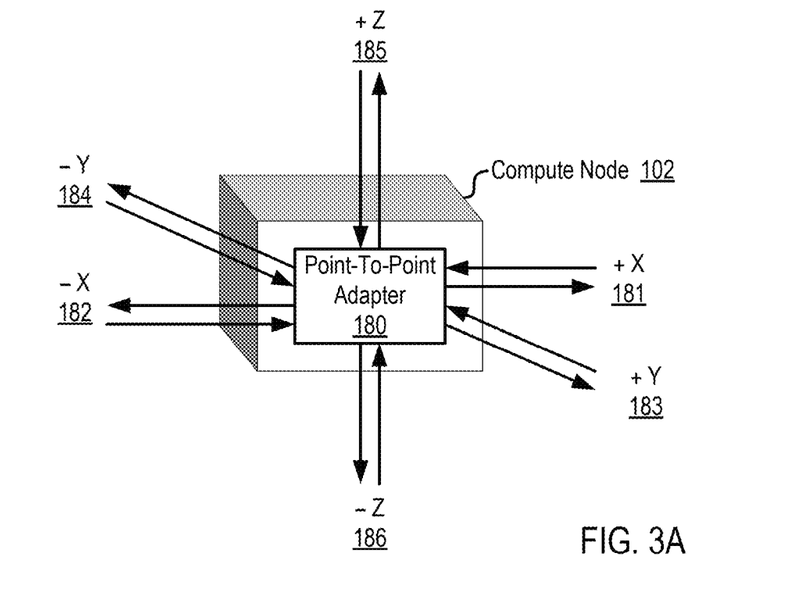
FIG. 3A sets forth a block diagram of an example Point-To-Point Adapter useful in systems for processing unexpected messages at a compute node of a parallel computer according to embodiments of the present invention.

For further explanation, FIG. 3A sets forth a block diagram of an example Point-To-Point Adapter (180) useful in systems capable of processing unexpected messages at a compute node of a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
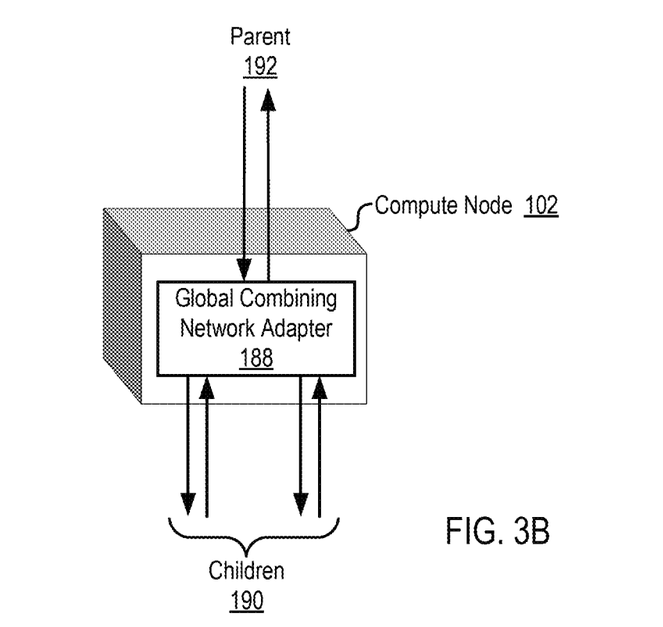
FIG. 3B sets forth a block diagram of an example Global Combining Network Adapter useful in systems for processing unexpected messages at a compute node of a parallel computer according to embodiments of the present invention.

For further explanation, FIG. 3B sets forth a block diagram of an example Global Combining Network Adapter (188) useful in systems capable of processing unexpected messages at a compute node of a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
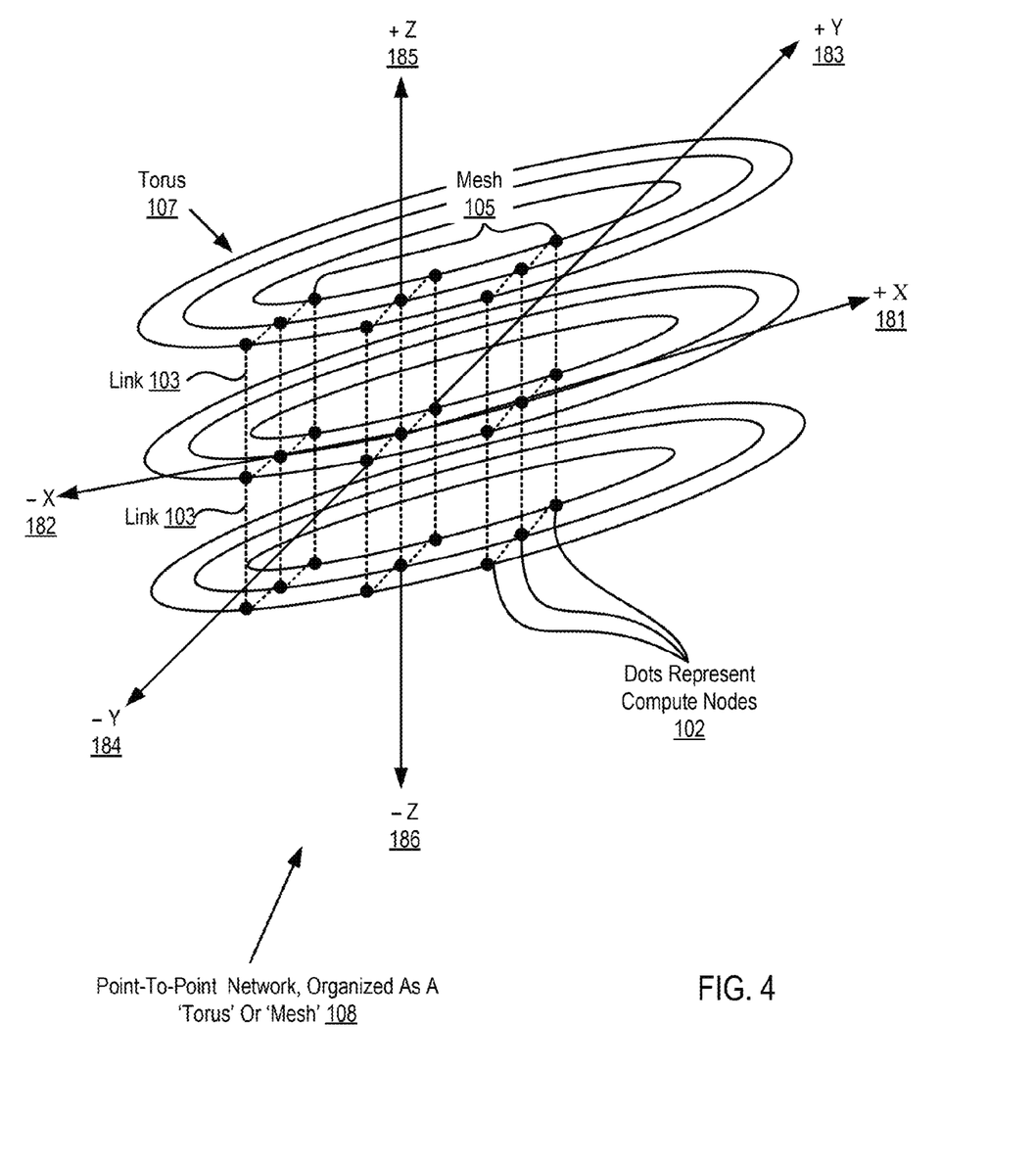
FIG. 4 sets forth a line drawing illustrating an example data communications network optimized for point-to-point operations useful in systems capable of processing unexpected messages at a compute node of a parallel computer according to embodiments of the present invention.

For further explanation, FIG. 4 sets forth a line drawing illustrating an example data communications network (108) optimized for point-to-point operations useful in systems capable of processing unexpected messages at a compute node of a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in processing unexpected messages at a compute node of a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in processing unexpected messages at a compute node of a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
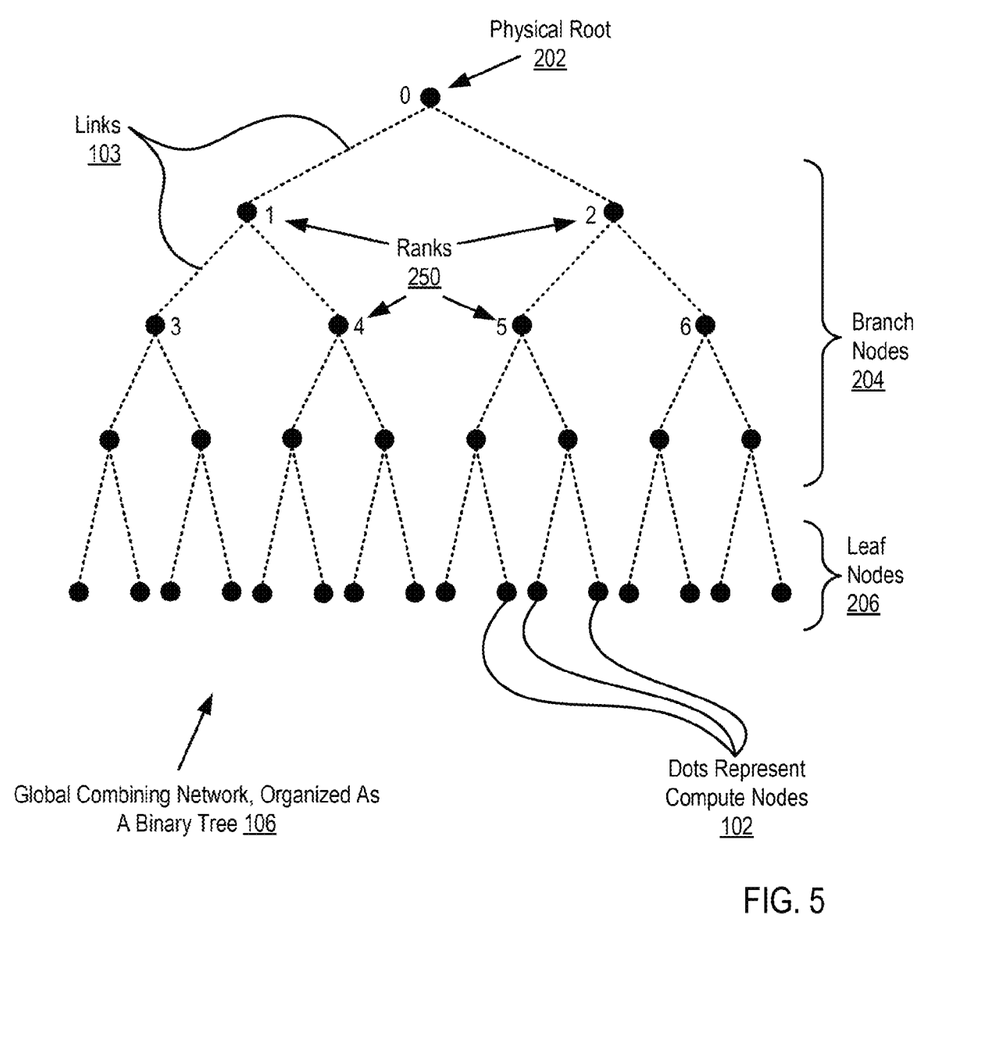
FIG. 5 sets forth a line drawing illustrating an example global combining network useful in systems capable of processing unexpected messages at a compute node of a parallel computer according to embodiments of the present invention.

For further explanation, FIG. 5 sets forth a line drawing illustrating an example global combining network (106) useful in systems capable of processing unexpected messages at a compute node of a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in processing unexpected messages at a compute node of a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
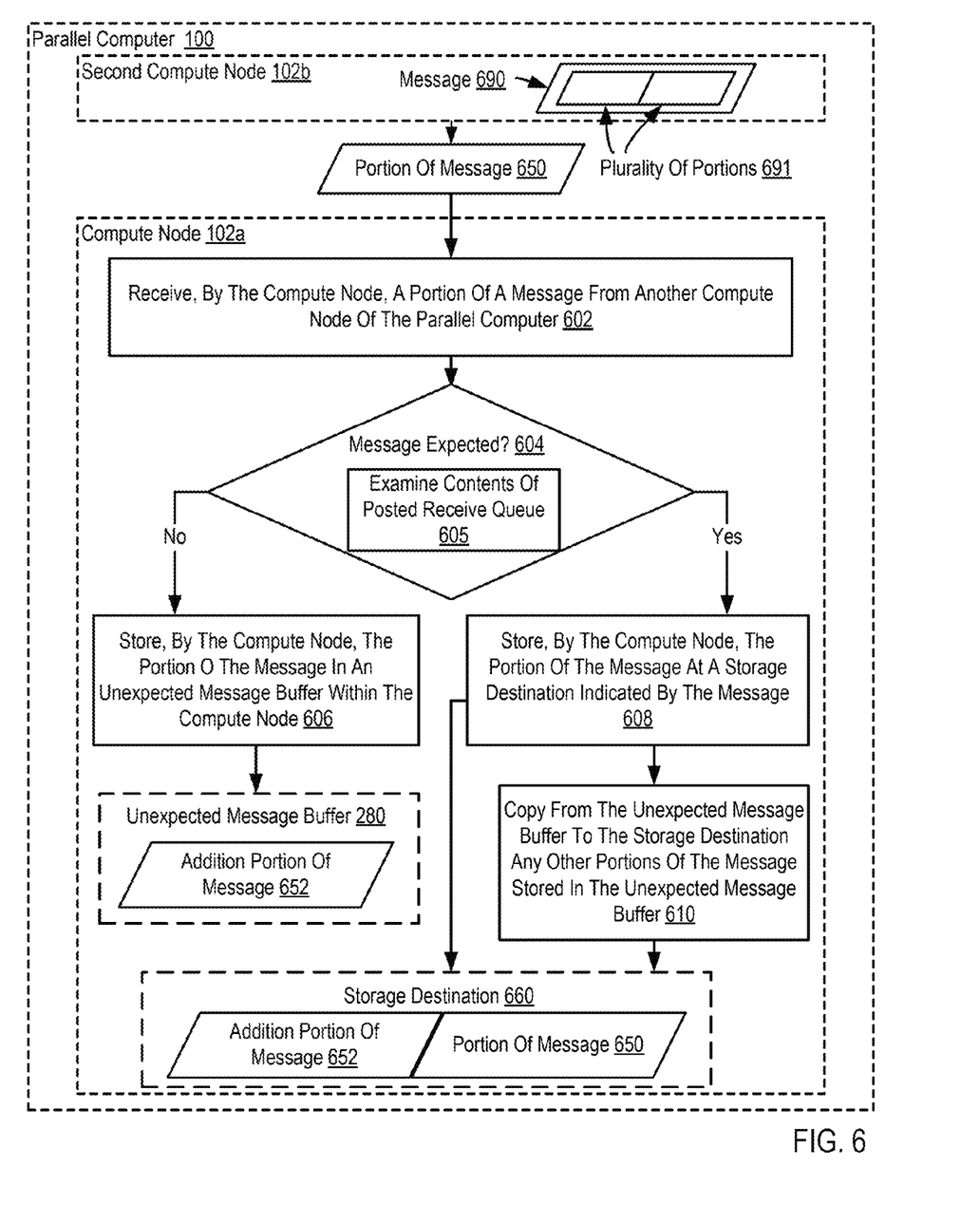
FIG. 6 sets forth a flow chart illustrating an exemplary method for processing unexpected messages at a compute node of a parallel computer according to embodiments of the present invention.

For further explanation, FIG. 6 sets forth a flow chart illustrating an exemplary method for processing unexpected messages at a compute node of a parallel computer according to embodiments of the present invention. The method of FIG. 6 includes receiving (602), by the compute node (102*a*), a portion (650) of a message (690) from another compute node (102*b*) of the parallel computer (100). The message (690) of FIG. 6 includes a plurality (691) of portions. That is, the compute node (102*a*) receives individual portions of the message (690) and combines the portions to form the message (690). In a particular embodiment, each received portion of the message has its own header and payload that is distinct from the other portions of the message (690). Receiving (602), by the compute node (102*a*), a portion (650) of a message (690) from another compute node (102*b*) of the parallel computer (100) may be carried out by receiving a portion (650) of the message at a reception buffer within a message unit (199). A message unit may use a reception buffer to immediately store any incoming messages before portions of the message are routed to an unexpected message buffer in the case that the message is unexpected or to a final storage destination if the message is expected.

The method of FIG. 6 includes in response to receiving the portion (650) of the message, determining (604), by the compute node (102*a*), whether one of the applications (270) executing on the compute node (102*a*), has indicated that the message (690) is expected. Determining (604), by the compute node (102*a*), whether one of the applications (270) executing on the compute node (102*a*), has indicated that the message (690) is expected may be carried out by checking one or more posted receive queues for indications that the message is expected. A posted receive queue comprises entries that identify receive requests that were generated in response to function calls made by applications executing on a compute node. These receive requests are commands or requests to receive data from other compute nodes via one or more data communication networks. For example, determining (604), by the compute node (102*a*), whether one of the applications (270) executing on the compute node (102*a*), has indicated that the message (690) is expected may be carried out by examining (605) the contents of a posted receive queue (282) for an indication that one of the applications (270) executing on the compute node expects the message (690). Examining (605) the contents of a posted receive queue (282) for an indication that one of the applications (270) executing on the compute node expects the message (690) may be carried out comparing information from a header of the message (690) with information corresponding to receive requests stored within the posted receive queue (282).

If one of the applications (270) executing on the compute node (102*a*) has not indicated that the message (690) is expected, the method continues by storing (606), by the compute node (102*a*), the portion (650) of the message (690) in an unexpected message buffer (280) within the compute node (102*a*). Storing (606), by the compute node (102*a*), the portion (650) of the message (690) in an unexpected message buffer (280) within the compute node (102*a*) may be carried out by identifying a location within the unexpected message buffer (280) that corresponds to source information contained within the portion (650) of the message (690); and storing the portion (650) of the message (690) at the identified location within the unexpected message buffer (280).

If one of the applications (270) executing on the compute node (102*a*) has indicated that the message (690) is expected, the method continues by storing (608), by the compute node (102*a*), the portion (650) of the message (690) at a storage destination (660) indicated by the message (690). Storing (608), by the compute node (102*a*), the portion (650) of the message (690) at a storage destination (660) indicated by the message (690) may be carried out by examining the contents of the portion (650) of the message (690) to determine the location of the storage destination; and storing the portion (650) of the message (690) at the determined location of the storage destination. A storage destination may be located at any location within the parallel computer. For example, the compute node (102*a*) may store the portion (650) of the message (690) within RAM (156).

In response to determining that one of the applications (270) executing on the compute node (102*a*) has indicated that the message (690) is expected, the method of FIG. 6 continues by copying (610) from the unexpected message buffer (280) to the storage destination (660) indicated by the message (690), by the compute node (102*a*), any other portions (652) of the message (690) stored in the unexpected message buffer (280). Because portions of the message (690) that are received before an application (270) executing the compute node (102*a*) indicates that the message (690) is expected are stored in the unexpected message buffer (280), the unexpected message buffer (280) may include multiple portions of the message. Copying (610) from the unexpected message buffer (280) to the storage destination (660) indicated by the message (690), by the compute node (102*a*), any other portions (652) of the message (690) stored in the unexpected message buffer (280) may be carried out by identifying portions of the message (690) that are stored within the unexpected message buffer (280) and copying the identified portions to the storage destination. For example, a first portion of the message (690) may be received first and before a particular application indicates that the message (690) is expected. In this example, the compute node (102*a*) stores the first portion of the message (690) in the unexpected message buffer (280). Continuing with this example, a second portion of the message (690) is received second and after the particular application indicates the message (690) is expected. Because the second portion is received after the particular application indicates that the message (690) is expected, the second portion of the message is stored at the storage destination indicated in the message and not in the unexpected message buffer. That is, only the portions of the message (690) that are received before an application indicates that the message is expected are stored in the unexpected message buffer. By only storing the portions of the message that are received before an application indicates that the message is expected in the unexpected message buffer—not all of the portions of the message, the compute node (102*a*) may save space within the unexpected message buffer. In a particular embodiment, the compute node concurrently stores the portion (650) of the message (650) into the storage destination (660) and copies to the storage destination (660) any other portions (652) of the message (690) stored in the unexpected message buffer (280). That is, the compute node can store all portions of the message (690) in the storage destination (660) without first storing all of the portions of the message (690) in the unexpected message buffer (280).

Exemplary embodiments of the present invention are described largely in the context of a fully functional computer system for processing unexpected messages at a compute node of a parallel computer. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of processing unexpected messages at a compute node of a parallel computer, the parallel computer comprising a plurality of compute nodes coupled for data communications via a data communication network, the method comprising:
receiving, by the compute node, a portion of a message from another compute node of the parallel computer, the message comprising a plurality of separate portions;
in response to receiving the portion of the message, determining, by the compute node, whether one of a plurality of applications executing on the compute node, has indicated that the message is expected;
if one of the applications executing on the compute node has not indicated that the message is expected, storing, by the compute node, the portion of the message in an unexpected message buffer within the compute node prior to the compute node receiving the entire message; and
if one of the applications executing on the compute node has indicated that the message is expected:
storing, by the compute node, the portion of the message at a storage destination indicated by the message;
identifying, by the compute node, any other portions of the message stored in the unexpected message buffer; and
copying from the unexpected message buffer to the storage destination indicated by the message, by the compute node, the other portions of the message stored in the unexpected message buffer.

2. The method of claim 1 wherein determining whether one of the applications executing on the compute node, has indicated that the message is expected includes examining the contents of a posted receive queue for an indication that one of the applications executing on the compute node expects the message.

3. The method of claim 1 wherein the compute node concurrently stores the portion of the message into the storage destination and copies to the storage destination any other portions of the message stored in the unexpected message buffer.

4. The method of claim 1 wherein the plurality of compute nodes are coupled for data communications via a plurality of data communication networks.

5. The method of claim 1 wherein the plurality of compute nodes are coupled for data communications via a global combining network.

6. An apparatus for processing unexpected messages at a compute node of a parallel computer, the parallel computer comprising a plurality of compute nodes coupled for data communications via a data communication network, the apparatus comprising a computer processor, a computer memory operatively coupled to the computer processor, the computer memory having disposed within it computer program instructions that when executed by the computer processor cause the apparatus to carry out the steps of:
receiving, by the compute node, a portion of a message from another compute node of the parallel computer, the message comprising a plurality of separate portions;
in response to receiving the portion of the message, determining, by the compute node, whether one of a plurality of applications executing on the compute node, has indicated that the message is expected;
if one of the applications executing on the compute node has not indicated that the message is expected, storing, by the compute node, the portion of the message in an unexpected message buffer within the compute node prior to the compute node receiving the entire message; and
if one of the applications executing on the compute node has indicated that the message is expected:
storing, by the compute node, the portion of the message at a storage destination indicated by the message;
identifying, by the compute node, any other portions of the message stored in the unexpected message buffer; and
copying from the unexpected message buffer to the storage destination indicated by the message, by the compute node, the other portions of the message stored in the unexpected message buffer.

7. The apparatus of claim 6 wherein determining whether one of the applications executing on the compute node, has indicated that the message is expected includes examining the contents of a posted receive queue for an indication that one of the applications executing on the compute node expects the message.

8. The apparatus of claim 6 wherein the compute node concurrently stores the portion of the message into the storage destination and copies to the storage destination any other portions of the message stored in the unexpected message buffer.

9. The apparatus of claim 6 wherein the plurality of compute nodes are coupled for data communications via a plurality of data communication networks.

10. The apparatus of claim 6 wherein the plurality of compute nodes are coupled for data communications via a global combining network.

11. A computer program product for processing unexpected messages at a compute node of a parallel computer, the parallel computer comprising a plurality of compute nodes coupled for data communications via a data communication network, the computer program product disposed upon a computer readable storage medium, wherein the computer readable storage medium is not a signal, the computer program product comprising computer program instructions capable, when executed, of causing a computer to carry out the steps of:
receiving, by the compute node, a portion of a message from another compute node of the parallel computer, the message comprising a plurality of separate portions;
in response to receiving the portion of the message, determining, by the compute node, whether one of a plurality of applications executing on the compute node, has indicated that the message is expected;
if one of the applications executing on the compute node has not indicated that the message is expected, storing, by the compute node, the portion of the message in an unexpected message buffer within the compute node prior to the compute node receiving the entire message; and
if one of the applications executing on the compute node has indicated that the message is expected:
storing, by the compute node, the portion of the message at a storage destination indicated by the message;
identifying, by the compute node, any other portions of the message stored in the unexpected message buffer; and
copying from the unexpected message buffer to the storage destination indicated by the message, by the compute node, the other portions of the message stored in the unexpected message buffer.

12. The computer program product of claim 11 wherein determining whether one of the applications executing on the compute node, has indicated that the message is expected includes examining the contents of a posted receive queue for an indication that one of the applications executing on the compute node expects the message.

13. The computer program product of claim 11 wherein the compute node concurrently stores the portion of the message into the storage destination and copies to the storage destination any other portions of the message stored in the unexpected message buffer.

14. The computer program product of claim 11 wherein the plurality of compute nodes are coupled for data communications via a plurality of data communication networks.

15. The computer program product of claim 11 wherein the plurality of compute nodes are coupled for data communications via a global combining network.

* * * * *